United States Patent
Marrou

(10) Patent No.: US 8,434,048 B2
(45) Date of Patent: Apr. 30, 2013

(54) METHOD FOR IMPLEMENTING POWER GATING IN AN INTEGRATED CIRCUIT DESIGN LOGIC BLOCK INCLUDING N-NARY DYNAMIC LOGIC (NDL) GATES

(75) Inventor: Ben A. Marrou, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/178,892

(22) Filed: Jul. 8, 2011

(65) Prior Publication Data

US 2012/0151426 A1 Jun. 14, 2012

Related U.S. Application Data

(60) Provisional application No. 61/422,481, filed on Dec. 13, 2010.

(51) Int. Cl.
*G06F 17/50* (2006.01)
(52) U.S. Cl.
USPC .......................................... 716/133
(58) Field of Classification Search .................. 716/100, 716/133
See application file for complete search history.

(56) References Cited

U.S. PATENT DOCUMENTS

| 7,080,341 | B2 | 7/2006 | Eisenstadt |
| 7,266,797 | B2 | 9/2007 | Bakir |
| 7,590,962 | B2 | 9/2009 | Frenkil |
| 7,714,610 | B2 | 5/2010 | He |
| 2011/0296118 | A1* | 12/2011 | Carter et al. ................ 711/154 |

* cited by examiner

*Primary Examiner* — Suchin Parihar
(74) *Attorney, Agent, or Firm* — Stephen J. Curran; Meyertons, Hood, Kivlin, Kowert & Goetzel, P.C.

(57) ABSTRACT

A method for adding power gating to an integrated circuit design logic block that includes N-Nary dynamic logic (NDL) gates includes determining an initial number of power gating rows to add to the logic block. The logic block includes a number of rows of logic gates in which some of the rows include gates implemented as one of n NDL circuits, where n may be any positive integer. The method also includes determining a total power gating device width for all of the power gating rows, and determining a distribution of the power gating device width among a final number of power gating rows based upon a number of different clock phases used to clock the gates implemented as one of n NDL circuits. The method further includes placing the power gating rows within the logic block.

21 Claims, 5 Drawing Sheets

METHOD FOR IMPLEMENTING POWER GATING IN AN INTEGRATED CIRCUIT DESIGN LOGIC BLOCK INCLUDING N-NARY DYNAMIC LOGIC (NDL) GATES

This patent application claims priority to Provisional Patent Application Ser. No. 61/422,481, filed Dec. 13, 2010, which is herein incorporated by reference in its entirety.

BACKGROUND

1. Technical Field

This disclosure relates to integrated circuit design, and more particularly to a method for implementing power gating in a logic block that includes N-nary dynamic logic (NDL) gates.

2. Description of the Related Art

Electronic devices and particularly those with modern processors are capable of consuming a great deal of power. To conserve battery life, in many systems it is becoming commonplace to turn off components that are not being used. Power gating, which is the term used to describe completely removing the voltage reference or the circuit ground reference from the component, is being widely used. This is in contrast to simply stopping the clock on a processor, for example. However, although power gating may be one of the most effective ways to reduce power consumption of a component, conventional power gating has some drawbacks particularly when dealing with dynamic or "domino" logic circuits that have more than one clock phase such as in 1-of-N or N-nary dynamic logic (NDL) circuits.

One such drawback is it is often difficult to determine how big to make the power gating transistors. More particularly, the power gating transistors need to be wide enough to carry the appropriate amount of current so that the voltage drop across the power gating transistors remains within design rules. In addition, the designer must ensure that the transistors are not so large that the power gating transistors take up unnecessary area. Further, optimal power gating row placement and distribution can be difficult.

SUMMARY OF THE EMBODIMENTS

Various embodiments of a method for adding power gating to an integrated circuit design logic block that includes N-Nary dynamic logic (NDL) gates are disclosed. Broadly speaking, a method is contemplated that determines how much total device width is needed for power gating devices in the NDL logic block. The method also determines how many power gating rows should be used, and how to distribute that total power gating device width among a total number of power gating rows.

In one embodiment, the method includes determining an initial number of power gating rows to add to the logic block. The logic block includes a number of rows of logic gates in which some of the rows include gates implemented as one of n NDL circuits, where n may be any positive integer. The method also includes determining a total power gating device width for all of the power gating rows, and determining a distribution of the power gating device width among a final number of power gating rows based upon a number of different clock phases used to clock the gates implemented as one of n NDL circuits. The method further includes placing the power gating rows within the logic block.

In one particular implementation, determining the total power gating device width may include determining a total Vdd connected width for all of the rows and multiplying the total Vdd connected width by a multiplier value.

Figure 1:
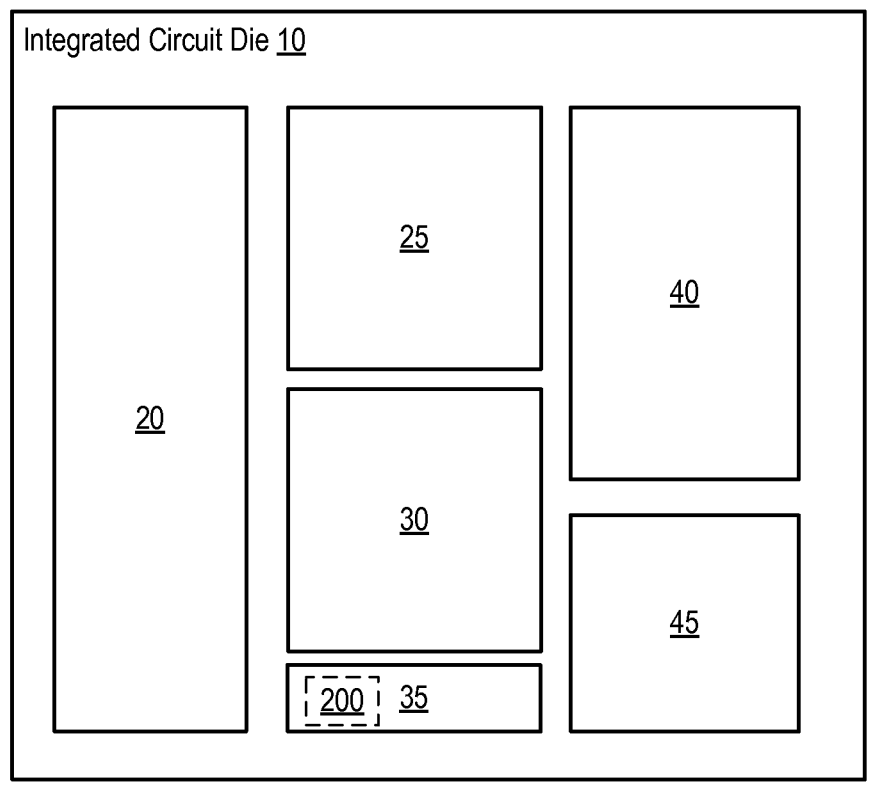
FIG. 1 is a floorplan diagram of an integrated circuit die.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Turning now to FIG. 1, a layout view of a floorplan of an integrated circuit is shown. Integrated circuit 10 includes several circuit blocks that are designated as 20, 25, 30, 35, 40 and 45. These circuit blocks may be representative of any type of circuit block. For example, in one embodiment, integrated circuit 10 may be representative of a system on a chip (SOC) such as a processor that includes various functional blocks such as one or more central processing units (CPUs), a memory controller, one or more cache memories, a power management unit, and the like. Accordingly, each of the circuit blocks may include a great number of transistors. In the floorplan of FIG. 1, these transistors have been arranged into the various logic blocks, and the blocks have been arranged according to the various design rules.

As mentioned above, to save power, various blocks or portions of circuit blocks may be powered down when not in use. Accordingly, in one embodiment power gating blocks that include one or more power gating transistors may be inserted into the design. For example, a small portion (e.g., 200) of circuit block 35 is shown in FIG. 2.

Figure 2:
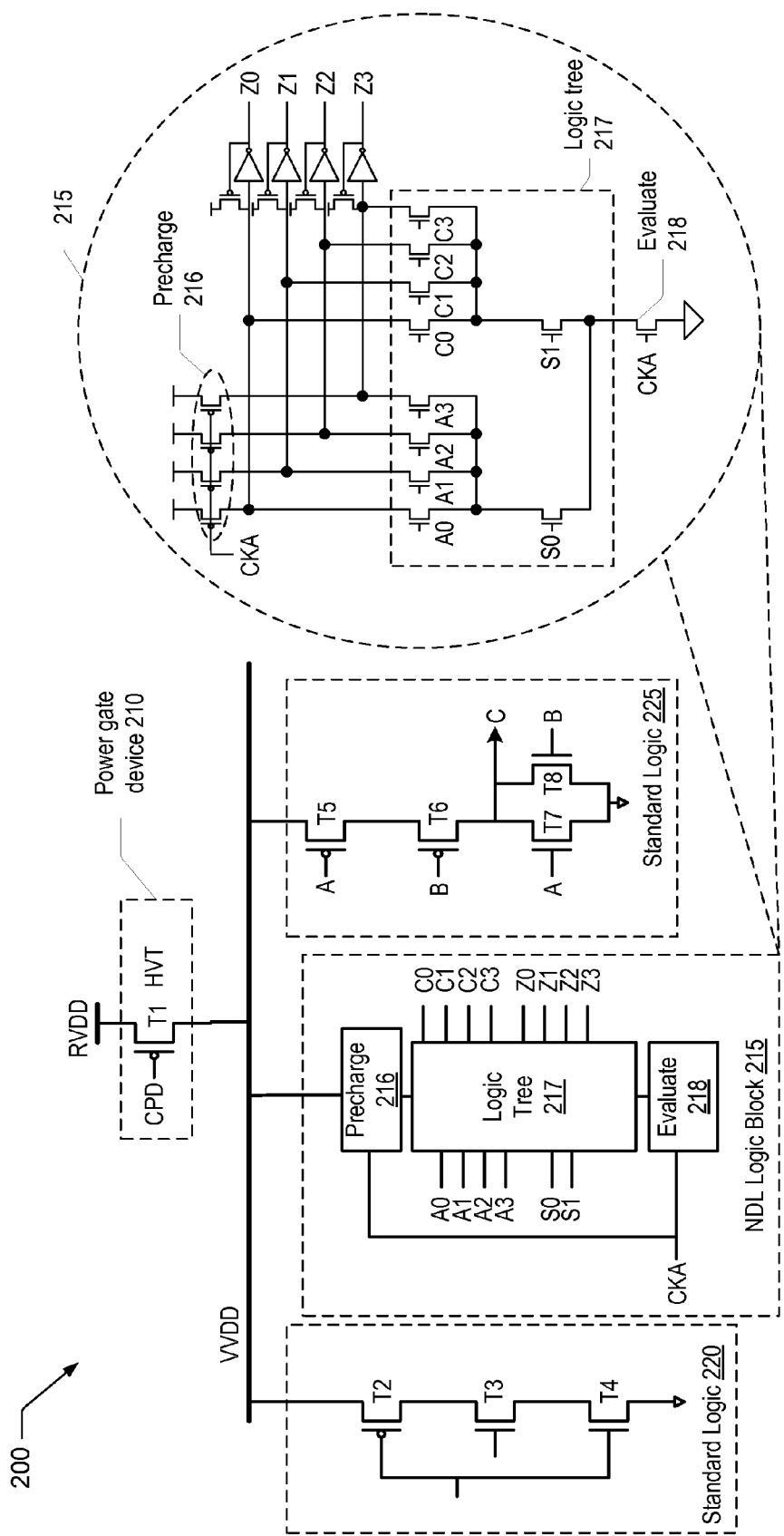
FIG. 2 is a schematic diagram of an exemplary circuit including a power gating device.

Referring to FIG. 2, a schematic diagram of an exemplary circuit including a power gating device is shown. More particularly, the circuit 200 includes a power gate device 210 coupled between the system VDD power rail (e.g., RVDD) and the internal circuit logic block power rail (e.g., VVDD). In the illustrated embodiment, the power gating device 210 includes a p-type metal oxide semiconductor (PMOS) transistor T1, which is also known as a PFET. As shown, various logic blocks may be power gated such that the logic blocks are coupled between the VVDD rail and the circuit ground reference. It is noted that although only one gating device 210 is shown, it is contemplated that in other embodiments many such gating devices 210 may be used in parallel.

In the illustrated embodiment, the logic blocks include a standard logic block 220, standard logic block 225, and an NDL block 215. As shown, the NDL logic block includes a representative NDL gate which includes a logic tree circuit 217 that couples to one or more input paths and one or more output paths. The logic tree circuit 217 is a single, shared logic tree comprising transistors organized into multiple evaluation paths that evaluate the function of the logic circuit (e.g., an AND/NAND function, an OR/NOR function, or an XOR/Equivalence function, multiplexer, and the like). The logic tree 217 is precharged using a precharge circuit 216 and evaluates using an evaluate circuit 218, both of which are controlled by the clock signal CKA.

In the exploded view of NDL logic block 215 an exemplary 2:1 NDL multiplexer that is implemented using a 1 of 4 or "quadenary" encoding is shown. Specifically, the data lines use 1 of 4 encoding and the select lines use 1 of 2 encodings. More particularly, the NDL multiplexer 215 includes two inputs, A and C and an output Z, where each of the inputs and outputs uses a quadenary (1 of 4) encoding and the selects use a one of two encoding. As shown, the select bits S0 and S1 are on the bottom. Accordingly, only one of the 1 of 4 input signals will be selected by only one of the 1 of 2 selects and the appropriate output will be asserted. The other three data inputs are ignored, as is the other select. It is noted that the illustrated embodiment is but one implementation of a 2:1 quadenary logic mux and that other specific implementations are possible and contemplated.

Since the mux 215 is a quadenary logic mux, there are 4 signals for each input and output. The logic tree portion 217 includes an N-channel transistor for each of the data inputs A0-A3 and C0-C3. Likewise there is one N-channel transistor for each of selects S0-S1. Thus, the two-stack of N-channel transistors in the logic tree is quick to evaluate. In the illustrated embodiment, the evaluate portion 218 includes a single N-channel transistor that is coupled to circuit ground and to the CKA clock signal. However, the precharge portion 216 includes one P-Channel transistor for each of the output lines, and each is coupled to the CKA clock signal. The output stage includes an inverter and a P-channel transistor for each output line. This configuration is referred to as a hold circuit, which holds the pre-charge value on the output until the logic tree evaluates to a logic zero.

Figure 4:
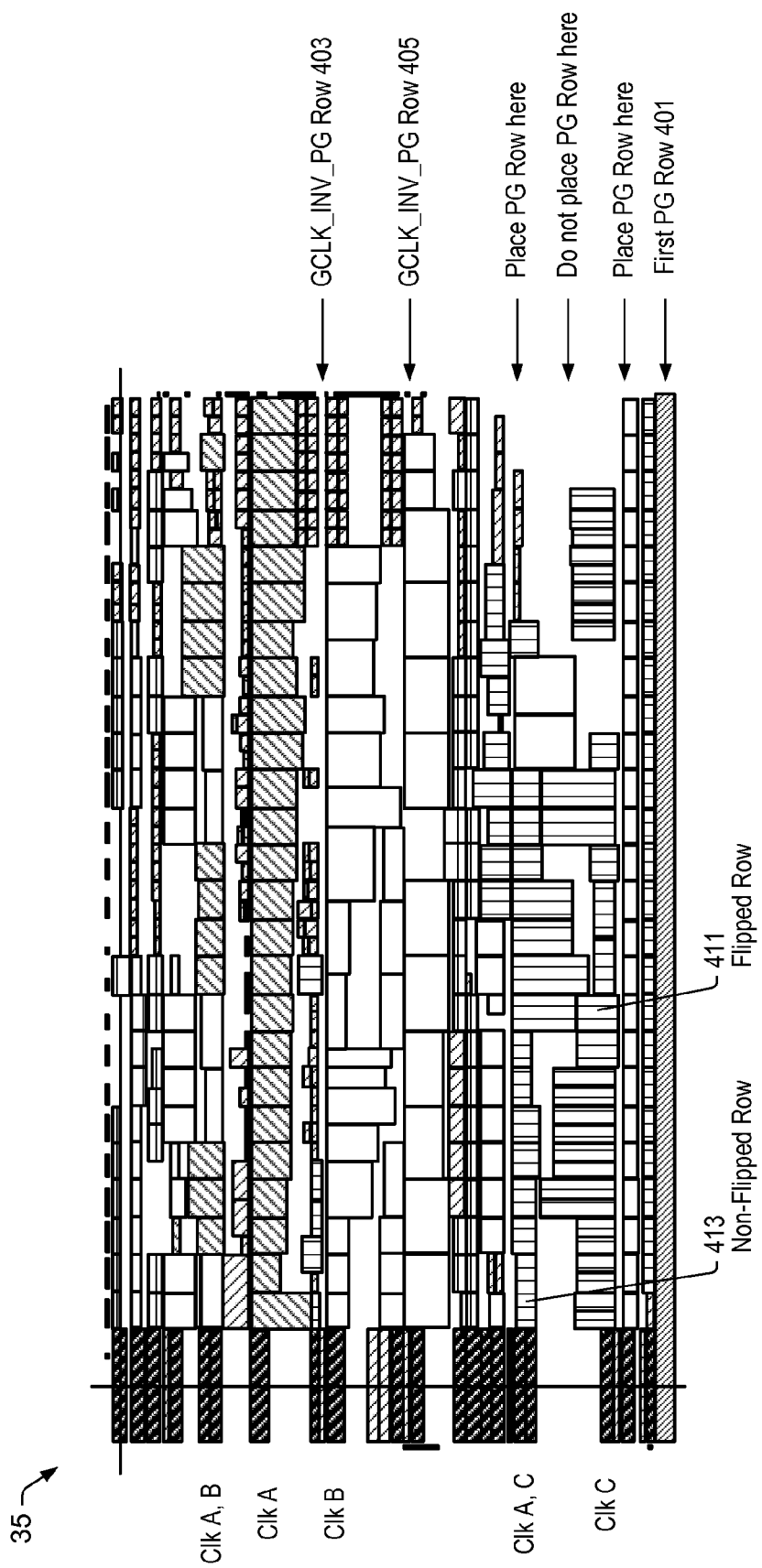
FIG. 4 is a gate level floorplan diagram of an embodiment of a circuit block of an integrated circuit that includes NDL logic.

It is noted that in a typical NDL block, there may be many other types 1 of N NDL gates implemented in the NDL logic block 215, each of which may use a different clock having a different phase then the CKA clock. Thus several clock phases may be used to drive the various NDL circuits within the NDL blocks. As shown in FIG. 4, more than one clock may be used to clock the logic gates in a given logic row. As such, some rows may use one clock, while another row may use two clocks, while still other rows may use three or more clocks.

Referring back to the general circuit 200, upon the CPD signal of FIG. 2 being driven to a logic zero value, the transistor T1 conducts and provides a path for current to supply the circuits coupled to the VVDD power rail. When the CPD signal is driven to a logic one value the transistor T1 stops conducting and blocks the current to the VVDD power rail, thereby gating the power to the rest of the circuit. As will be described in greater detail below, it is important to properly size the power gate device(s) to ensure that they can provide the necessary current without causing a voltage drop in excess of a particular voltage (e.g., 5 mV). Thus, it may be beneficial to think about two primary tasks when implementing power gating for NDL blocks. These tasks are: estimating the amount of power gating width needed, and determining how to distribute the power gating width within a circuit.

Generally speaking, to properly size the power gate device(s) refers to balancing the amount of device width (e.g., PFET width) that connects to the VDD supply with the width of a power gate device. For example, in the circuit shown in FIG. 2, the transistor T1 would have to have a width that is at least as large as the combined width of the transistors T2, T5, the precharge PFETs, the output inverter PFETs, and the output pull-up transistors, assuming all of these devices are active at the same time.

Estimating the PG Width

To estimate the power gating width for a given NDL logic block, various techniques may be used. For example, a theoretical equation-based approach may be used in which the estimation may be made based upon knowledge of NDL clock phases, basic activity statistics, and cell level simulation data. The equation weights the power gating width estimation toward the phase that has the most activity and transistor width. An exemplary PG width equation is as follows:

$$\sum_{i=0}^{3} \left[ \frac{ph\_vdd\_width_i}{total\_vdd\_width} (ph\_vdd\_width_i)(3.0)(0.25) \right]. \quad (1)$$

More particularly, for each phase 'i', the amount of device width (e.g., PFET width) that connects to VDD based upon the total width (i.e., total_vdd_width) and the width per phase (i.e., ph_vdd_width) of the devices connected to VDD is calculated, and then summed over all phases. In equation 1, the constant value 3.0 corresponds to a general width multiplication factor. For example, in one embodiment, this constant factors in how much larger a power gating device (PG) device would need to be (e.g., to guarantee no more than a 5 mV drop) compared to a PFET width in a single cell during switching, based on standalone gate experiments (INV, NOR, etc.). The constant value 0.25 corresponds to an activity factor (e.g., 0.5 in this example) multiplied by a switching Factor (e.g., 0.5 in this example) for a cell. In one embodiment, the activity factor may represent the probability that a particular phase is active, while the switching factor represents a measure of how many gates are switching for the phase that is active. It is noted that in the context of the amount of device width connected to VDD, the VDD being referred to is the internal/gated VDD supply such as the VVDD shown in FIG. 2.

Another approach to estimate the power gating width of the block is an empirical approach which may be based on circuit simulations. More particularly, a single (large) PG device may be added to an NDL design, and the PG size may be swept (i.e., varied) during power simulation to find a value that meets the voltage drop specification across the PG device. The PG size may be swept while simulating over multiple NDL blocks to calculate a multiplier value. The multiplier value may be applied against the total VDD-connected width for each block similar to the general width multiplication factor described above. Accordingly, the multiplier value may be indicative of a ratio of how much larger than the total VDD-connected width of the NDL design the power gating width needs to be to ensure that the voltage droop stays within some predetermined value. Then the multiplier value may be used on other NDL blocks after initial sizing has been completed.

Determining Distribution of Power Gating Width

Once the amount of PG width has been determined, the power gating width may be distributed throughout an NDL circuit logic block. Accordingly, power gating rows may be placed among the circuit logic block rows in some fashion. It may be beneficial to introduce the concept of rows in the logic block. Accordingly, in one embodiment, an NDL logic block may include a number of rows, and each row may include a number of NDL gates. FIG. 4 is a gate level floorplan diagram of an embodiment of a circuit block. Accordingly, as described in greater detail below, the various blocks in FIG. 4 are logic gates, which have been placed in the illustrated configuration by a circuit design tool.

There are some general guidelines for placement of the power gating rows among the circuit logic block rows. More particularly, generally no more than two to three logic rows containing clocked logic should be between power gating rows. If the clocked logic rows contain multiple large tiles or cells, then favor two logic rows between power gating rows. In addition, no more than three to five consecutive static logic rows should be between power gating rows, depending on the size of the static gates. Further, as described below in conjunction with the description of FIG. 4, to avoid interference with jigsaw fitting, the power gating rows should only be placed above a non-flipped row or below a flipped row.

In addition, special circumstances may arise that require special power gating attention. More particularly, certain circuit cells may include components that have an unusually large width connected to VDD. For example, in one embodiment, a clock distribution circuit may be configured to drive a clock through a clock tree. In such a circuit an inverter or inverters may include a large PFET connected to VDD. Accordingly, it may be necessary or at least recommended to place a PG row very close to a logic row that includes such a clock circuit. For example, FIG. 4 illustrates two such potential placements in which GCLK_INV_PG Row 403 and GCLK_INV_PG Row 405 are placed toward the middle of the block.

In addition to the above general guidelines, a more detailed calculation-based approach may be taken to determine the distribution of the power gating width. During width estimation based upon current densities, the distribution of power gating width should consider percentage of row width as well as clock phase distribution within the row. To illustrate the distribution concept, an example block includes a set of three logic rows (e.g., r1, r2, r3) that use four clock phases and the estimated PG width from Equation 1 above is 6μ, (i.e., 6 microns). The three rows have a combined width of 15μ. Row one has all four clock phases distributed as follows: ph0=1μ, ph1=1μ, ph2=1μ and ph3=1μ, and 26.7% (4μ/15μ) of row width percentage. Row two has two phases such that ph2=2μ and ph3=3μ and 33.3% (5μ/15μ) of row width percentage. Row three has only ph3=6μ and 40% (6μ/15μ) of row width percentage.

Based on row width percentage alone, the first estimate may be made based on the following equation $$(x_1+x_2+x_3)\text{pg\_w}=\text{pg\_w} \quad (3)$$

where x1 is the row width percentage for row one, x2 is the row width percentage for row two, and x3 is the row width percentage for row three. Thus, the following results are obtained $$r1 = (0.267)(6\ \mu) = 1.60\ \mu$$
$$r2 = (0.333)(6\ \mu) = 1.99\ \mu$$
$$r3 = (0.400)(6\ \mu) = 2.40\ \mu$$
$$= 6\ \mu$$

From the above example, row three would get more of the PG row width distribution than row 2, which would get more of the PG row width distribution than row 1.

However, since rows that use fewer clock phases have a higher likelihood that more devices could be sourcing simultaneously, the rows which predominantly use one or two clock phases should get more power gating width. Thus, in addition to row width, the phase weight should be taken into account. Accordingly, a phase weight variable may be used. Accordingly, based on both row width percentage and phase weights the following equations can be used:

$$(x_1y_1+x_2y_2+x_3y_3)\text{pg\_w}=\text{pg\_w} \quad (4)$$

$$y_2=3y_1 \quad (5)$$

$$y_3=6y_1. \quad (6)$$

In row one, the row width percentage corresponds to x1 and the phase weight corresponds to y1. In row two, the row width percentage corresponds to x2 and the phase weight corresponds to y2, and in row three, the row width percentage corresponds to x3 and the phase weight corresponds to y3. To solve the equations, the phase widths are expressed in terms of y1 and the values from the above example are substituted. Equations 5 and 6 express ratios of the largest phase width per row in terms of y1. More particularly, the largest phase width in row three is Ph3 with 6μ, while the largest phase width in row one thus the 6:1 ratio. Similarly, in row two Ph3 has the largest phase width with 3μ, thus the 3:1 ratio of y2 to y1.

Using equations 4 through 6, and solving for y1 initially by substituting equations 5 and 6 into equation 4 yields:

$$(x_1y_1+x_23y_1+x_36y_1)\text{pg\_w}=\text{pg\_w} \quad (7)$$

Thus, substituting from above yields $$(0.267y_1+0.333(3)y_1+0.4(6)y_1)6=6 \quad (8)$$

Solving for y1=0.273. The final calculation for PG width is the product of row width % and phase weight in equation 5:

$$r1=(0.267)(0.273)(6u)=0.44u$$

$$r2=(0.333)(0.82)(6u)=1.64u$$

$$r3=(0.400)(1.64)(6u)=3.94u$$

The sum approximately adds up to 6 u.

Accordingly, although row 3 still receives more of the PG width than row 2, the PG width for each row is different when calculated using the phase weights than with the row width percentage alone. In particular, it is shown that the rows with fewer clock phases have been allocated more PG width, and the rows with more clock phases have less PG width.

Figure 3:
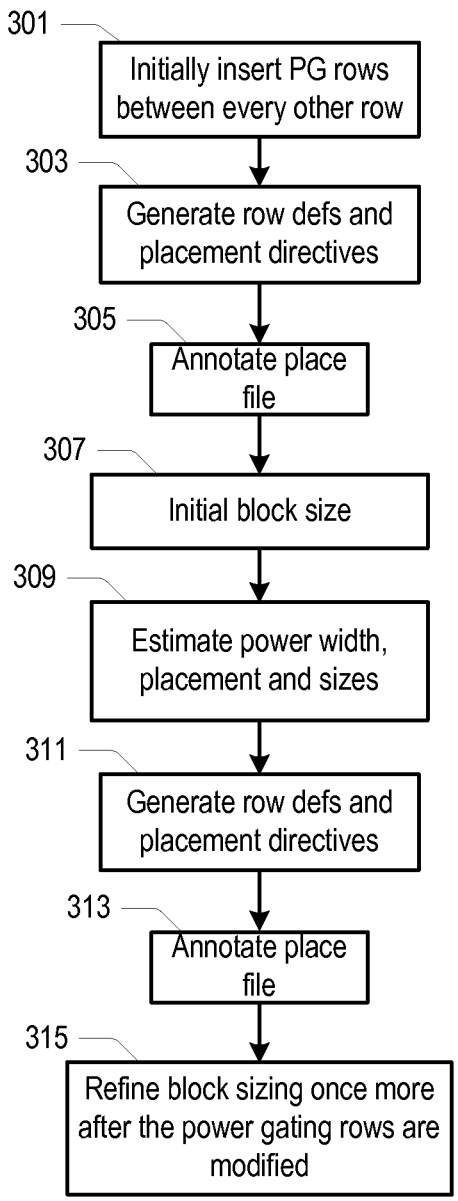
FIG. 3 is a flow diagram depicting an operational flow for implementing power gating in an integrated circuit block.

Turning to FIG. 3, a flow diagram depicting an operational flow for implementing power gating in an NDL block of an integrated circuit is shown. Beginning in block 301, to improve initial logic sizing, the impact of the power gating rows needs be considered at a first order. The recommendation for doing this begins with inserting power gating rows of a predetermined size between every other logic row. In one embodiment, the sizing may be a mid-range size of the available sizes. Thus, the initial number of power gating rows would be:

$$num\_pg\_rows=num\_logic\_rows/2. \quad (2)$$

Next, row definitions and placement directives should be generated to place the rows into the logic block. The row definitions and placement directives may be used by a circuit design automation tool to layout the integrated circuit. In one embodiment, the generation of the row definitions and placement directives may be done manually by inspection using the guidelines as described above. In another embodiment a specialized software utility or tool may be invoked to generate row definitions and placement directives (block 303). The utility may provide an output that may be used to annotate the place file (block 305). The place file may be used by the circuit design automation tool to place the rows of logic. In one embodiment the place file may include row definitions and row orderings and block coordinates for all rows of the logic block. Accordingly, to place the PG rows, the place file may be annotated to include the PG row placement by adding the PG rows in the correct position within the row order.

In one embodiment, the circuit design automation tool may be an integrated hardware design development tool that may include a great deal of design functionality. The tool may include schematic generation from the NDL source, placement and layout of NDL logic blocks, generation of netlist files, and generation of layout files for IC fabrication, among others. More particularly, when designing an NDL circuit, the NDL source code defines both the logic function and the topology of each gate. This is in contrast to a hardware definition language (HDL) representation of a circuit, which defines the logic function but not the topology. In an NDL design flow, the designer writes the NDL source and that source is used to generate a circuit design library or design database which, in conjunction with the pace file, is used to generate a gate level floorplan as shown in FIG. 4. The circuit design automation tool uses the place file to place the logic gates in the rows, and the rows into the floorplan.

The block may then be initially sized as described above (block 307). Once the block is initially sized, more accurate estimations for the required power gating width can be made as described further below because the initial sizing and placement is may be thought of as a first pass and a rough estimate.

To improve the estimation and placement of the power gating rows, in one embodiment, one of the PG width estimation techniques that were described above may be used. In another embodiment, another more detailed software utility may be used to estimate the power gating width, and generate row sizes and definitions and placement directives while taking into account the general placement guidelines discussed above. More particularly, in addition to the PG width and some initial placement guidelines, further constraints may be placed on the placement of the PG rows. For example, current densities based on activity and NDL phase, electromigration current limits, voltage drop due to insufficient PG row width or power wiring that is too long, area reduction via jigsaw fits, and inrush current control, etc. may be used to determine placement of PG rows (block 309). In one embodiment, the second software utility may automatically perform the above tasks. For example, in one embodiment after an initial block sizing and initial PG row placement, the utility may obtain all VDD connected width, apply a multiplier such as the general width multiplication factor described above to come up with total width estimate, and then use the estimate to determine where to place the rows based upon the above constraints. In other embodiments, the software may use the approach based on equation 1 described above to determine the total PG width estimate.

Finally, the row definitions and placement directives may again be generated (block 311). As described above, in one embodiment, row definitions and placement directives may be generated manually. However, in other embodiments the row definitions and placement directives may be generated by running the software utility as described above. The place file may be annotated as described above and the power gating rows may be placed accordingly by the placement tool (block 313). Once the power gating rows have been modified, the block sizing may be refined again to obtain the best possible area.

Referring to FIG. 4 a gate level floorplan diagram of an embodiment of a circuit block of an integrated circuit that includes NDL logic is shown. The floorplan diagram depicts an exemplary gate level representation of a floorplan of the circuit block 35 of FIG. 1. As shown, there are multiple logic gates or "cells" that have been arranged into a number of rows. Each of the gates is represented as a rectangle in FIG. 4. In one embodiment, the various gates in some rows use different phases of clocks as described above, which are represented by different shading and patterns. For example, one row is shown as being clocked by Clk A, while another row is clocked by Clk B, another by Clk C, another by clks A and B, and another by Clks A and C. It is noted that for the rows having more than one clock, the percentage of VDD connected width on a per clock phase basis is not necessarily balanced. Specifically, the row clocked by clks A and B may be more balanced than then the row clocked by clks A and C, for example.

In addition, as described above the NDL logic block 35 includes components that have an unusually large width connected to VDD. Accordingly, it is recommended to place a PG row very close to the logic row that includes such a clock circuit. Thus, two such potential placements in which GCLK_INV_PG Row 403 and GCLK_INV_PG Row 405 are placed toward the middle of the block, as shown.

Furthermore, the NDL logic block 35 includes a pair of rows having a jigsaw fit. These are identified by the non-flipped row 413 and the flipped row 411, which has been flipped to provide a more compact block size. Accordingly, one of the guidelines described above states that a PG row should not be placed between rows having a jigsaw fit. However, PG rows may be placed directly before or after rows having a jigsaw fit as indicated in FIG. 4. Similarly, in many cases the first PG row to be placed may be placed before the first logic row. This is indicated by the first PG row 401.

Figure 5:
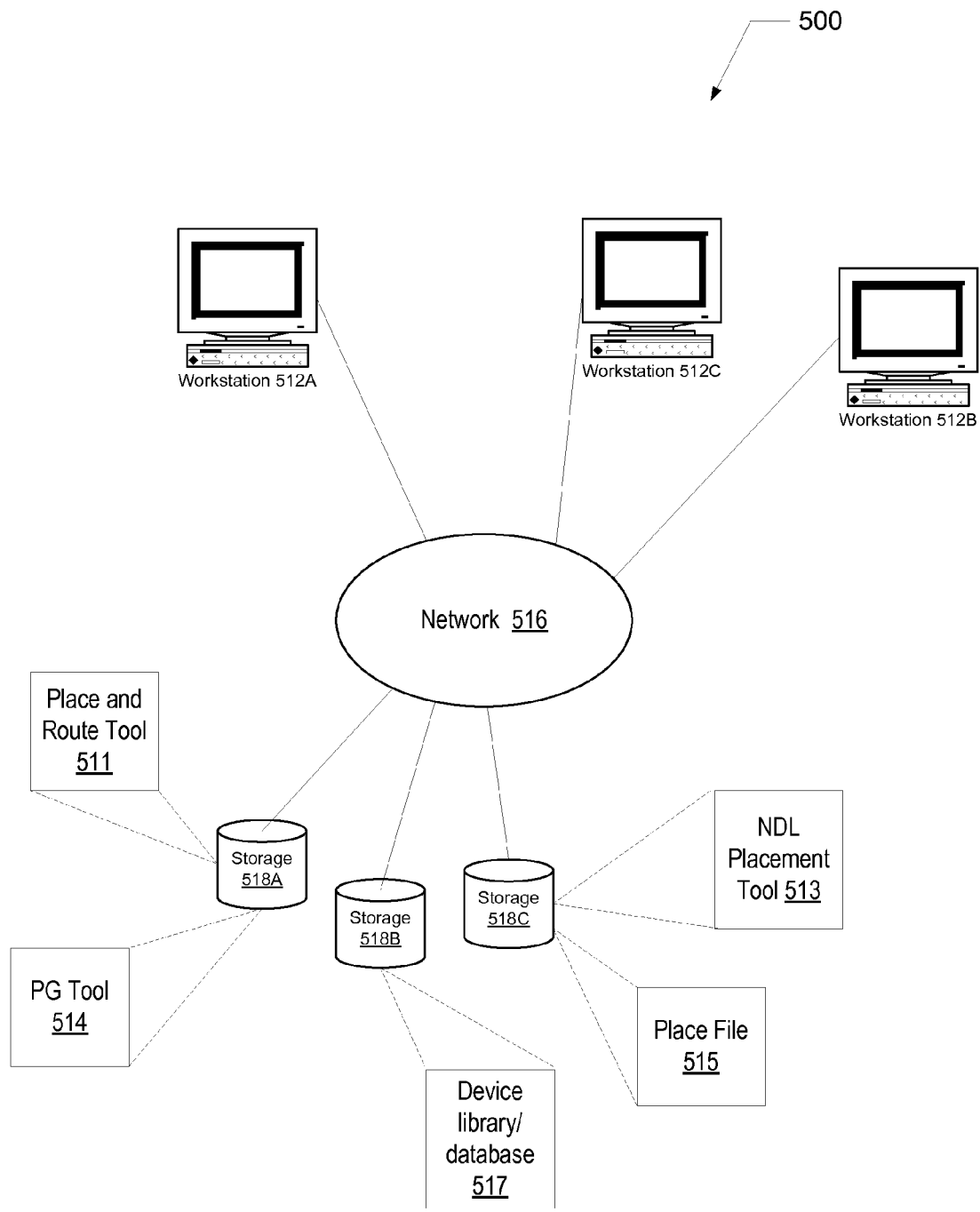
FIG. 5 is a block diagram of one embodiment of a computer system used to implement an automated IC design tool for implementing power gating in an NDL block of an integrated circuit design.

In FIG. 5, a block diagram of one embodiment of a computer system used to implement an automated IC design tool for implementing power gating in an NDL block of an integrated circuit design is shown. In one embodiment, the power gating flow described above may be performed manually on a computer by a user. In various other embodiments, the design tools and specifically the power gating tool may comprise program instructions that may be written in any programming or scripting language and may perform the operations described above in an automated fashion such that once a user provides initial setup and configuration and initiates execution of the program instructions, one or more portions of the tools may be run without further intervention. The power gating design tool and the other EDA tools may comprise program instructions that execute on one or more processors or processing units of a computer system. As such, a block diagram of one embodiment of a computer system that may be used to implement the design tools is shown in FIG. 5.

Turning to FIG. 5, computer system 500 includes a plurality of workstations designated 512A through 512C. The workstations are coupled together through a network 516 and to a plurality of storages designated 518A through 518C. In one embodiment, each of workstations 512A-512C may be representative of any standalone computing platform that may include, for example, one or more processors, local system memory including any type of random access memory (RAM) device, monitor, input output (I/O) means such as a network connection, mouse, keyboard, monitor, and the like (many of which are not shown for simplicity).

In one embodiment, storages 518A-518C may be representative of any type of mass storage device such as hard disk systems, optical media drives, tape drives, ram disk storage, and the like. As such, the program instructions comprising the design tools may be stored within any of storages 518A-518C and loaded into the local system memory of any of the workstations during execution. As an example, as shown in FIG. 5, the place and route tool 511 and the power gating tool 514 are shown stored within storage 518A, while the place file 515 and the NDL placement tool 513 are stored within storage 518C. Further, the device library 517 is stored within storage 518B. Additionally, the program instructions may be stored on a portable/removable storage media. The program instructions may be executed directly from the removable media or transferred to the local system memory or mass storages 518 for subsequent execution. As such, the portable storage media, the local system memory, and the mass storages may be referred to as non-transitory computer readable storage mediums. The program instructions may be executed by the one or more processors on a given workstation or they may be executed in a distributed fashion among the workstations, as desired.

In one embodiment, the PG tool 614 may be used to add power gating to a logic block that includes NDL logic circuits. In one embodiment, PG tool 614 may include program instructions written in any of a variety of programming languages or scripting languages, and which may be executable by a processor to perform the above tasks.

It is noted that although the computer system shown in FIG. 5 is a networked computer system, it is contemplated that in other embodiments, each workstation may also include local mass storage. In such embodiments, the program instructions and the results of the design tools may be stored locally. Further, it is contemplated that the program instructions may be executed on a standalone computer such as a personal computer that includes local mass storage and a system memory.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for adding power gating to a logic block within an integrated circuit (IC) design, the method comprising:
   performing, by a processor:
      determining an initial number of power gating rows to add to the logic block, wherein the logic block includes a plurality of rows of logic gates, wherein at least some of the rows of the plurality of rows include gates implemented as one of n N-Nary dynamic logic (NDL) circuits, where n may be any positive integer;
      determining a total power gating device width for all power gating rows;
      determining a distribution of power gating device width among a final number of power gating rows based upon a number of different clock phases used to clock the gates implemented as one of n NDL circuits; and
      placing the power gating rows within the logic block.

2. The method as recited in claim 1, wherein rows having a fewer number of clock phases receive a larger distribution of power gating width than rows having a greater number of clock phases.

3. The method as recited in claim 1, further comprising determining the distribution of power gating width based upon a percentage of Vdd connected width for each row out of a total row width of all rows.

4. The method as recited in claim 3, wherein rows having a greater row width percentage receive a larger distribution of power gating width.

5. The method as recited in claim 1, wherein determining the initial number of power gating rows includes dividing a total number of rows of logic gates by two.

6. The method as recited in claim 1, wherein determining the total power gating device width includes:
   determining a total Vdd connected width for all rows of the plurality of rows of logic gates; and
   multiplying the total Vdd connected width by a multiplier value.

7. The method as recited in claim 6, wherein the multiplier value corresponds to a value indicative of a ratio of how much larger than the total Vdd connected width for all rows of the plurality of rows of logic gates a power gating device is required to be to supply current to the circuit to which it is connected without causing a voltage drop that is larger than a predetermined voltage.

8. The method as recited in claim 7, wherein determining the multiplier value includes:
   placing a test power gating device within one or more standalone NDL circuits; and
   simulating the one or more standalone NDL circuits while varying a width of the test power gating device while monitoring a voltage drop across the test power gating device.

9. The method as recited in claim 1, wherein placing the power gating block rows within the logic block includes generating row definitions and placement directives for use by a logic placement design tool.

10. A non-transitory computer readable storage medium including program instructions for adding power gating to a logic block within an integrated circuit (IC) design, the program instructions are executable by a processor to:
   determine an initial number of power gating rows to add to the logic block, wherein the logic block includes a plurality of rows of logic gates, wherein at least some of the rows of the plurality of rows include gates implemented as one of n N-Nary dynamic logic (NDL) circuits, where n may be any positive integer;
   determine a total power gating device width for all power gating rows;
   determine a distribution of power gating device width among a final number of power gating rows based upon a number of different clock phases used to clock the gates implemented as one of n NDL circuits; and
   place the power gating rows within the logic block.

11. The non-transitory computer readable storage medium as recited in claim 10, further comprising program instructions executable by a processor to determine a percentage of Vdd connected width for each row out of a total row width of all rows.

12. The non-transitory computer readable storage medium as recited in claim 11, further comprising program instructions executable by a processor to calculate the distribution of the total power device gating width for a given row by multiplying the total power gating device width for the logic block by the percentage of Vdd connected width for the given row.

13. The non-transitory computer readable storage medium as recited in claim 10, further comprising program instructions executable by a processor to:
   determine a total Vdd connected width for all rows of the plurality of rows of logic gates; and
   multiply the total Vdd connected width by a multiplier value to determine the total power gating device width.

14. The non-transitory computer readable storage medium as recited in claim 10, further comprising program instructions executable by a processor to calculate the total power gating device width by multiplying the percentage of Vdd connected width per clock phase of the total Vdd connected width by the Vdd connected width per clock phase to obtain a result, multiplying the result by a width multiplier, an activity factor, and a switching factor, and summing over all clock phases.

15. The non-transitory computer readable storage medium as recited in claim 10, further comprising program instructions executable by a processor to place the power gating rows among the plurality of rows of logic gates without interfering with two adjacent rows that have been fit together in a jigsaw fit.

16. A system comprising:
   a memory configured to store program instructions for adding power gating to a logic block within an integrated circuit (IC) design; and
   a processing unit, in response to executing the instructions is configured to:
      determine an initial number of power gating rows to add to the logic block, wherein the logic block includes a plurality of rows of logic gates, wherein at least some of the rows of the plurality of rows include gates implemented as one of n N-Nary dynamic logic (NDL) circuits, where n may be any positive integer;
      determine a total power gating device width for all power gating rows;
      determine a distribution of power gating device width among a final number of power gating rows based upon a number of different clock phases used to clock the gates implemented as one of n NDL circuits; and
      place the power gating rows within the logic block.

17. The system as recited in claim 16, wherein the processing unit is further configured to calculate the distribution of the total power device gating width for a given row by multiplying the total power gating device width for the logic block by the percentage of Vdd connected width for the given row.

18. The system as recited in claim 16, wherein the processing unit is further configured to place the power gating rows among the plurality of rows of logic gates without interfering with two adjacent rows that have been fit together in a jigsaw fit.

19. The system as recited in claim 16, wherein the processing unit is further configured to place the power gating rows among the plurality of rows of logic gates based upon electromigration current density limits.

20. A method for adding power gating to a logic block within an integrated circuit (IC) design, the method comprising:
   performing, by a processor:
   determining an initial number of power gating rows to add to the logic block, wherein the logic block includes a plurality of rows of logic gates, wherein at least some of the rows of the plurality of rows include gates implemented as one of n N-Nary dynamic logic (NDL) circuits, where n may be any positive integer;
   determining a total power gating device width for all power gating rows;
   determining a distribution of power gating device width among a final number of power gating rows based upon a percentage of Vdd connected width for each row out of a total Vdd connected width of all rows, wherein rows having a greater row width percentage receive a larger distribution of power gating width; and
   placing the power gating rows within the logic block.

21. The method as recited in claim 20, wherein determining the total power gating device width includes:
   determining a total Vdd connected width for all rows of the plurality of rows of logic gates; and
   multiplying the total Vdd connected width by a multiplier value.

* * * * *